United States Patent
Lindskog

(10) Patent No.: US 8,515,377 B2
(45) Date of Patent: Aug. 20, 2013

(54) IMBALANCED TRANSMISSION COMBINING AT RADIO BASE STATION

(75) Inventor: Mats Kristian Lindskog, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1344 days.

(21) Appl. No.: 11/684,692

(22) Filed: Mar. 12, 2007

(65) Prior Publication Data
US 2008/0227413 A1    Sep. 18, 2008

(51) Int. Cl.
*H04B 1/06* (2006.01)
(52) U.S. Cl.
USPC .................................... 455/277.1; 455/562.1
(58) Field of Classification Search
CPC .............................. H04B 7/0814; H04B 16/28
USPC .................. 455/277.1, 273, 562.1
See application file for complete search history.

(56) References Cited

U.S. PATENT DOCUMENTS
2006/0001506 A1    1/2006   Razmpoosh

FOREIGN PATENT DOCUMENTS
| EP | 0 622 910 A2 | 11/1994 |
| JP | 2003-101312 A | 4/2003 |
| JP | 2003-198222 A | 7/2003 |
| JP | 2006-319704 A | 11/2006 |

OTHER PUBLICATIONS

International Search Report mailed Aug. 20, 2008 in corresponding PCT application PCT/SE2007/050886.

*Primary Examiner* — Lana N Le
(74) *Attorney, Agent, or Firm* — Nixon & Vanderhye, P.C.

(57) ABSTRACT

A radio base station (20) comprises an antenna (22); a first power amplifier (24₁) configured to receive a first carrier signal; a second power amplifier (24₂) configured to receive a second carrier signal; and an imbalanced combiner (30). The imbalanced combiner (30) is configured to apply a power imbalanced combined signal to the antenna. The power imbalanced combined signal has a power imbalance between a first power level of the first carrier signal and a second power level of the second carrier signal as transmitted from the antenna (22).

20 Claims, 8 Drawing Sheets

IMBALANCED TRANSMISSION COMBINING AT RADIO BASE STATION

BACKGROUND

I. Technical Field

This invention pertains to telecommunications, and particularly to the construction and operation of base stations which communicate with wireless terminals over an air interface.

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like, The radio access network (RAN) covers a geographical area which is divided into cell areas, with each cell area being served by a base station (sometimes called a "NodeB"). A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE), mobile stations, mobile termiawithin range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

In some radio access network arrangements, plural radio base stations may serve a common geographical region, but be operated differently, e.g., at different power levels. For example, a first radio base station (e.g., a macro radio base station) may operate with standard or even high transmit power to serve a fairly large geographical area (a "macro" cell). Such a radio base station endeavors to serve users (e.g., user equipment units (UEs)) of the cell, even users who may be geographically situated near an edge of the cell.

Usually not all users are located proximate a boundary or edge of the cell. In fact, some of the users within the geographical boundary of the macro cell may be served by a smaller cell or "micro" or "pico" cell, essentially contained within the macro cell. The smaller cell can be served by a radio base station which operates with a smaller transmit power. The cell structure of such a network design arrangement using radio base stations operating with different power (providing, e.g., macro and micro cells) is often referred to as underlay/overlay cells.

One of the most critical design parameters when designing a radio base station is power efficiency of the radio base station. As an example, for a telecommunications system known as Global System for Mobile communications (GSM), a good efficiency rating for transistors of a power amplifier (and thus the power amplifier itself) is about 50%, and probably more like 40% for a typical system. Yet the overall efficiency of a radio base station node is typically more like 10%. Thus, while some efficiency losses at the radio base station are thus attributable to the power amplifiers, other and perhaps more significant efficiency losses are sustained by other functions such as filtering and combining.

Combining is the process which facilitates two carriers (e.g., two different frequencies carrying a modulated information signal) using a single, shared antenna, rather than two separate antennas. Often the two carriers which are combined and transmitted over the shared antenna serve a same sector of a cell. For example, a typical GSM radio base station may be configured so that a cell has three sectors, each sector employing four carriers. Therefore, combining enables two carriers to be transmitted from each antenna, so that only six antennas rather than twelve antennas can be used for the twelve carriers of the base station.

Certain measurement units pertaining to power are briefly explained prior to discussing further the power inefficiency in a conventional radio base station. In conventional nomenclature, "dBm" is an abbreviation for the power ratio in decibel (dB) of the measured power referenced to one milliwatt (mW). It is used in radio, microwave and fiber optic networks as a convenient measure of absolute power because of its capability to express both very large and very small values in a short form. dBm (or dBmW) and dBW are independent of impedance. Zero dBm equals one milliwatt. A 3 dB increase represents roughly doubling the power, which means that 3 dBm equals roughly 2 mW. For a 3 dB decrease, the power is reduced by about one half, making −3 dBm equal to about 0.5 milliwatt. To express an arbitrary power P as x dBm, Equation 1 should be used. Or go in the other direction, Equation 2 should be used.

$$x=10\log_{10}(P/P_{bmw}) \qquad \text{Equation 1}$$

$$P=(P_{bmx})10^{(x/10)} \qquad \text{Equation 2}$$

An example of power inefficient of a typical, representative conventional radio base station 120 is illustrated in FIG. 1. The portions of radio base station 120 shown in FIG. 1 comprise power amplifiers $124_1$ and $124_2$ which feed a hybrid combiner 130. The output of the hybrid combiner 130 is applied to a duplex filter 132, which in turn feeds an antenna 122. The carriers driven by power amplifiers $124_1$ and $124_2$ are both applied with 46 dBm (40 Watts power) to hybrid combiner 130. The power loss of each carrier incurred through hybrid combiner 130 is 3.5 dB. The combined signal exiting hybrid combiner 130 suffers a 1.5 dB loss in duplex filter 132. As a result, the antenna 122 has two carrier signals, both being 41 dBm for a total antenna output power of 25 W. Of the 200 Watts in power applied to the power amplifiers $122_1$ and $122_2$, 175 Watts of heat is discharged through the circuit, e.g., through load 156, through power amplifiers $124_1$ and $124_2$, and through duplex filter 132.

As can be seen from the foregoing example, power inefficiency produces not only power consumption problems for a radio base station, but also heat dissipation issues. Heat dissipation is particularly important since as many as six antennas may be operating at a base station, with the consequence that the structure and heat of FIG. 1 may have a multiple of six. In order to generate the desired transmit output power of 20 W, such a base station running at full performance may generate about 2 kW of heat.

To assure operational integrity of a base station, the large amount of heat lost through inefficiency needs to be handled or dissipated. Ways of handling or coping with such a large amount of heat byproduct include rather large cooling fins and high performance noisy fans. Other cooling measures for an outdoor radio base station might include either a heat exchanger and/or combined air conditioning system (using, e.g., compressors). These cooling mechanisms and measures significantly increase cost of construction and operation of the radio base station, increasing power consumption and (even more so) size and weight and of the radio base station node. These ramifications are adverse to the environment and costly to the radio base station operator.

What is needed, therefore, and an object of the present invention, are one or more of apparatus, systems, methods and techniques for managing power usage and/or output of a radio base station.

BRIEF SUMMARY

A radio base station comprises an antenna; a first power amplifier configured to receive a first carrier signal; a second power amplifier configured to receive a second carrier signal; and an imbalanced combiner. The imbalanced combiner is configured to apply a power imbalanced combined signal to the antenna. The power imbalanced combined signal has a significant power imbalance between a first power level of the first carrier signal and a second power level of the second carrier signal at the antenna.

In an example embodiment, the imbalanced combiner comprises a coupler. The coupler comprises a first coupler element and a second coupling element. The first coupling element has a first end connected to an output of the first power amplifier and a second end connected to the antenna. The second coupler element is situated in spaced apart relationship to the first coupler element, and has a first end connected to an output of the second power amplifier and a terminated second end (e.g., terminated without connection to the antenna).

A coupling medium is preferably positioned, situated, or accommodated between first coupling element and second coupling element. One or more attributes of the coupling medium are chosen or changed to impart the power imbalance of the imbalanced combiner, e.g., the power imbalance between the first power level of the first carrier signal and the second power level of the second carrier signal. The one or more attributes of the coupling medium chosen to impart the power imbalance can be, for example, characteristic, composition or configuration (e.g., shape or dimension) of the coupling medium. In one example embodiment the coupling element happens to fluid, such as air, for example. In another example embodiment the coupling medium is either fluidic, solid, or semi-solid having one or more attributes selected to achieve the desired power imbalance.

The second coupler element is spaced apart from the first coupler element by a gap. In some example embodiments, the power imbalance in the power imbalanced combined signal is related to a magnitude of the gap. Stated differently, a power ratio of the first power level to the second power level is related to a magnitude of the gap (e.g., an example of configuration of the coupling medium). Typically the power ratio is in a range from about 2:1 to about 10:1. In other example embodiments, the power imbalance in the power imbalanced combined signal is related to one or more other attributes (e.g., characteristic, composition or configuration) of the coupling medium.

In some example embodiments, the imbalanced combiner is configured to have adjustable coupling of the first carrier signal and the second carrier signal for applying a selected power imbalance between the first power level of the first carrier signal and the second power level of the second carrier signal. As a first non-limiting example, the magnitude of a gap separating the second coupler element from the first coupler element is adjustable for applying the selected power imbalance between the first power level of the first carrier signal and the second power level of the second carrier signal. Many structural arrangements or techniques are possible for facilitating adjustment of the gap. In other example embodiments, the coupling medium is changeable for applying the selected power imbalance between the first power level of the first carrier signal and the second power level of the second carrier signal. Changeability of the coupling medium can be accomplished either through interchanging the coupling medium or modifying/adjusting an attribute (one or more of characteristic, composition, or configuration) of the coupling medium.

In an example implementation of the radio base station, the first carrier signal is for a user situated at a first distant from the radio base station and the second carrier signal is for a user situated at a second distant from the radio base station (the first distance is greater than the second distance), in a manner similar to providing a macro cell and a micro cell, respectively.

According to another aspect of the technology, a method of operating a radio base station comprises using a first power amplifier to obtain a first amplified carrier signal; using a second power amplifier to obtain a second amplified carrier signal; and obtaining (from the first amplified carrier signal and the second amplified carrier signal) a power imbalanced combined signal. The power imbalanced combined signal has a power imbalance between a first power level of the first carrier signal and a second power level of the second carrier signal In an example mode, the act of obtaining the power imbalanced combined signal comprises configuring a coupler to comprise a first coupler element and a second coupler element situated in spaced apart relationship to the first coupler element. The first coupler element has a first end connected to an output of the first power amplifier and a second end connected to the antenna. The second coupler element has a first end connected to an output of the second power amplifier and a terminated second end (e.g., terminated without connection to the antenna).

One mode further comprises spacing apart the second coupler element from the first coupler element by a gap having a gap magnitude related to a desired power imbalance in the power imbalanced combined signal. Stated differently, the mode comprises spacing part the second coupler element from the first coupler element by a gap having a gap magnitude related to a power ratio of the first power level to the second power level. Typically the mode includes pre-selecting the power ratio in a range from about 2:1 to about 10:1.

Another mode comprising selecting or choosing one or more attributes of the coupling medium to impart the power imbalance of the imbalanced combiner. The one or more attributes of the coupling medium that are chosen, adjusted, or interchanged to impart the desired power imbalance can be, for example, characteristic, composition or configuration (e.g., shape or dimension) of the coupling medium.

An example implementation of the method comprises operating the first carrier signal for a user situated at a first distant from the radio base station and operating the second carrier signal for a user situated at a second distant from the radio base station (the first distance being greater than the second distance), in a manner similar to operating a macro cell and a micro cell, respectively.

BRIEF DESCRIPTION OF THE DRAWINGS

The foregoing and other objects, features, and advantages of the invention will be apparent from the following more particular description of preferred embodiments as illustrated in the accompanying drawings in which reference characters

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology.

Figure 2A:
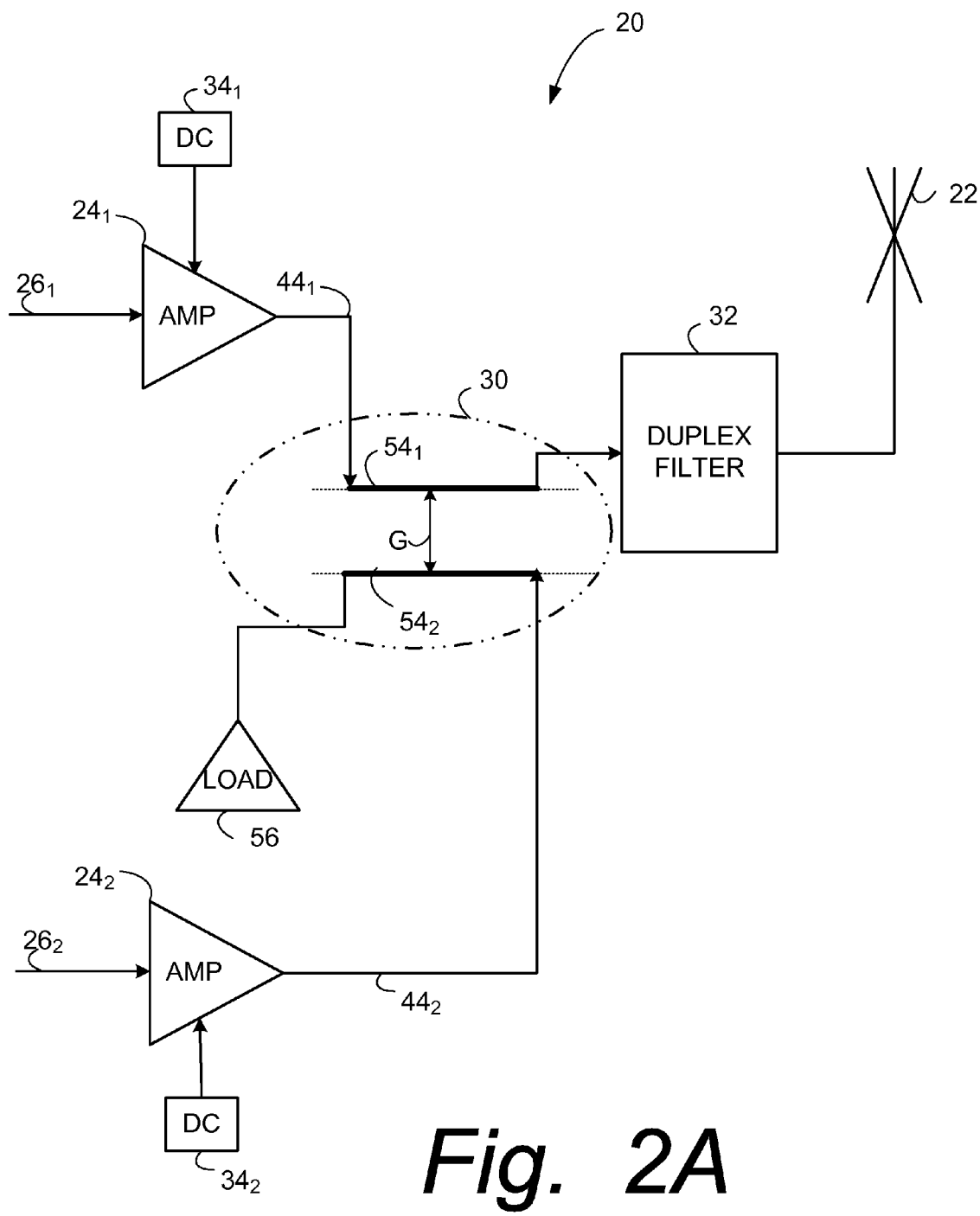
FIG. 2A is a schematic diagram showing portions of an example embodiment of a radio base station configured to employ an imbalanced combiner.

FIG. 2A shows portions of an example, non-limiting embodiment of a radio base station 20. The radio base station 20 comprises shared antenna 22; a first power amplifier $24_1$ configured to receive a first carrier signal input thereto on line $26_1$; a second power amplifier $24_2$ configured to receive a second carrier signal input thereto on line $26_2$; and an imbalanced combiner 30. The imbalanced combiner 30 is configured to apply a power imbalanced combined signal to antenna 22. In particular, imbalanced combiner 30 applies the power imbalanced combined signal to an intermediate duplex filter 32, from which the power imbalanced combined signal (now filtered) is applied to antenna 22. The duplex filter 32 shown in FIG. 2A also represents other lossy elements such as cables, etc.

Figure 1:
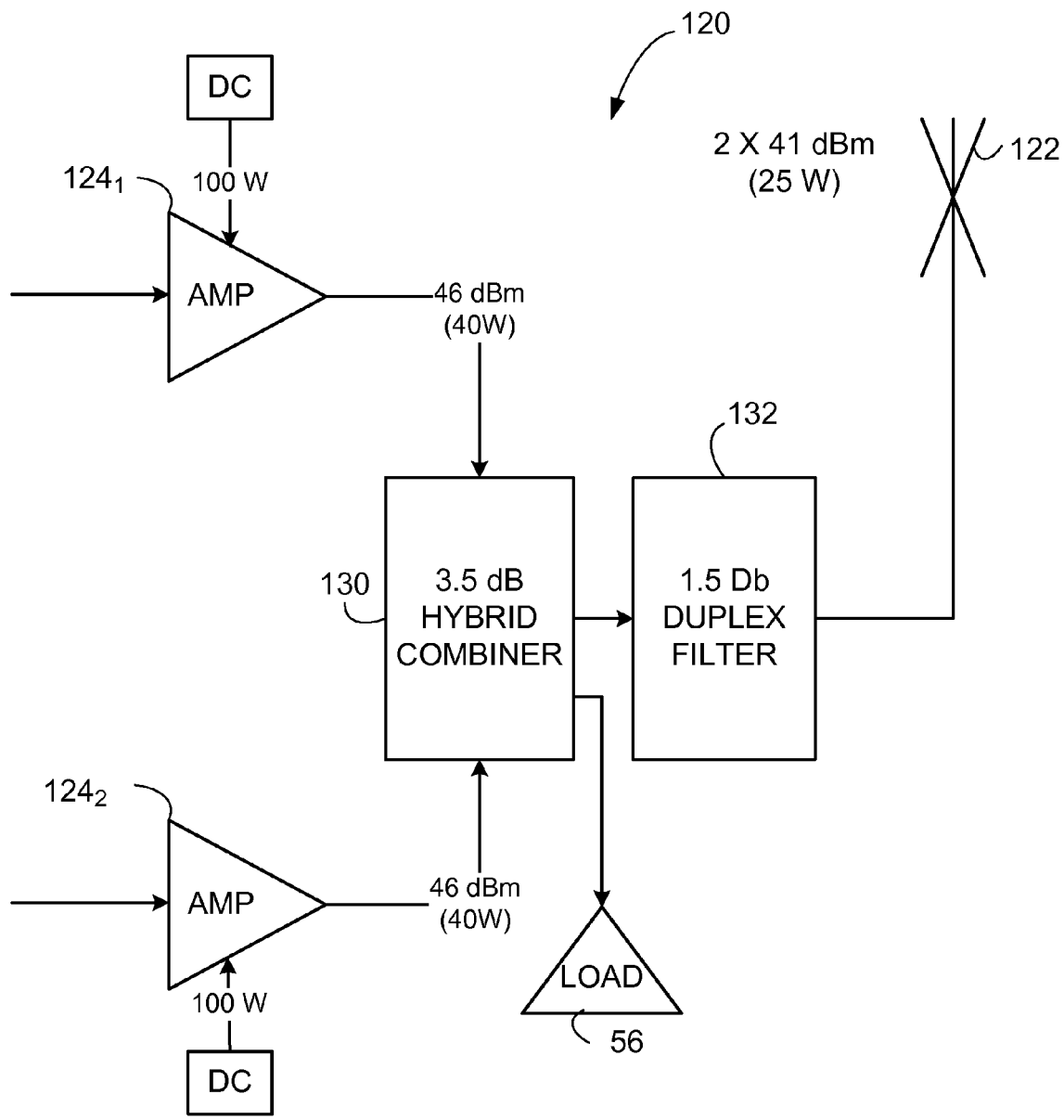
FIG. 1 is a schematic diagram showing portions of a conventional radio base station.

The particular power values shown in FIG. 2A are merely illustrative for sake of efficiency comparison with the conventional radio base station of FIG. 1. By no means is any embodiment described herein or encompassed hereby required or restricted to any particular power parameters. All such power parameters described are for example purposes only, it being fully apparent that other power parameters can be utilized in other embodiments.

Regarding the example power values of FIG. 2A, the example first power amplifier $24_1$ operates at 50 W by virtue of receiving power from DC power supply $34_1$. On the other hand, the example second power amplifier $24_2$ operates at 56 W by virtue of receiving power from DC power supply $34_2$. For sake of illustration, both first power amplifier $24_1$ and second power amplifier $24_2$ have an efficiency of approximately 40%. Accordingly, as applied to imbalanced combiner 30, the first carrier shown on line $44_1$ has a power of 43 dBm (20 W) while the second carrier shown on line $44_2$ has a power of 43.5 dBm (22 W).

The power imbalanced combined signal has a significant power imbalance between a first power level of the first carrier signal and a second power level of the second carrier signal at the antenna (e.g., as transmitted from the antenna). By significant power imbalance is meant that, after combination, the power level of the first carrier exceeds the power level of the second carrier by ten percent or more, and typically by fifty percent or more. FIG. 2A shows imbalanced combiner 30 as being enveloped by a double-dotted/dashed line. The imbalanced combiner 30 serves and is configured to impart or assure a power imbalance, as a combined signal is taken from imbalanced combiner 30, between the first power level of the first carrier signal (the carrier signal obtained from first power amplifier $24_1$) and the second power level of the second carrier signal (the carrier signal obtained from second power amplifier $24_2$) as these two carrier signals are transmitted from antenna 22.

In a non-limiting example embodiment, the imbalanced combiner 30 comprises a coupler. The coupler comprises a first coupler element $54_1$ and a second coupling element $54_2$. The first coupling element $54_1$ has a first end connected to an output of first power amplifier $24_1$ and a second end connected to antenna 22. The second coupler element $54_2$ is situated in spaced apart relationship to first coupling element $54_1$, and has a first end connected to an output of second power amplifier $24_2$ and a terminated second end (e.g., terminated without connection to antenna 22). Rather, the second end of second coupler element $54_2$ is connected to load 56. The load 56 can be a resistor, resistor network, or any other suitable heat dissipating element, e.g., a device that absorbs radio frequency power and radiates the absorbed power as heat. In this arrangement, the electric and magnetic fields in first coupling element $54_1$ travels in a different direction than the electric and magnetic fields in second coupler element $54_2$.

The first coupling element $54_1$ and second coupler element $54_2$ are each metal strips, so that imbalanced combiner 30 comprises two parallel, spaced-apart metal strips. Preferably the metal strips comprising first coupling element $54_1$ and second coupler element $54_2$ are pure low loss metals. The second coupler element $54_2$ is spaced apart from second coupler element $54_2$ by a gap G.

A coupling medium is preferably positioned, situated, or accommodated between first coupling element $54_1$ and second coupling element $54_2$. One or more attributes of the coupling medium are chosen to impart the power imbalance of the imbalanced combiner 30, e.g., the power imbalance between the first power level of the first carrier signal and the second power level of the second carrier signal. The one or more attributes of the coupling medium chosen to impart the power imbalance can be, for example, characteristics, composition or configuration (e.g., shape or dimension) of the coupling medium. In the example embodiment of FIG. 2A, the coupling element happens to fluid, such as air, for example. Another example embodiment of an imbalanced combiner 30(3) illustrated in FIG. 3A has either a fluidic, solid, or semi-solid coupling material 60 positioned between first coupling element $54_1$ and second coupling element $54_2$. An attribute such as characteristics (e.g., dielectric constant or other property), composition, and/or configuration (e.g., dimension, such as width) of coupling material 60 can be selected or changed (e.g., interchanged or modified) to achieve the desired power imbalance. Other than manner in which the imbalanced coupling is imparted, in other respects the structure and operation of the imbalanced combiner 30(3) of FIG. 3A resembles that of FIG. 2A.

In the example embodiment of FIG. 2A, the power imbalance in the power imbalanced combined signal output from imbalanced combiner 30 is related to a magnitude of gap G. Stated differently, a power ratio of the first power level of the first carrier as included in the imbalanced combined signal to the second power level of the second carrier as included in the imbalanced combined signal is related to a magnitude of the gap G. Further, like the magnitude of gap G, the lengths of the metal strips comprising first coupling element $54_1$ and second coupler element $54_2$ are frequency dependent upon the desired coupling. Typically the power ratio is in a range from about 2:1 to about 10:1. In other example embodiments such as that of FIG. 3A, the power imbalance in the power imbalanced combined signal is related to one or more other attributes (e.g., characteristic, composition, or configuration) of the coupling medium 60.

Figure 2B:
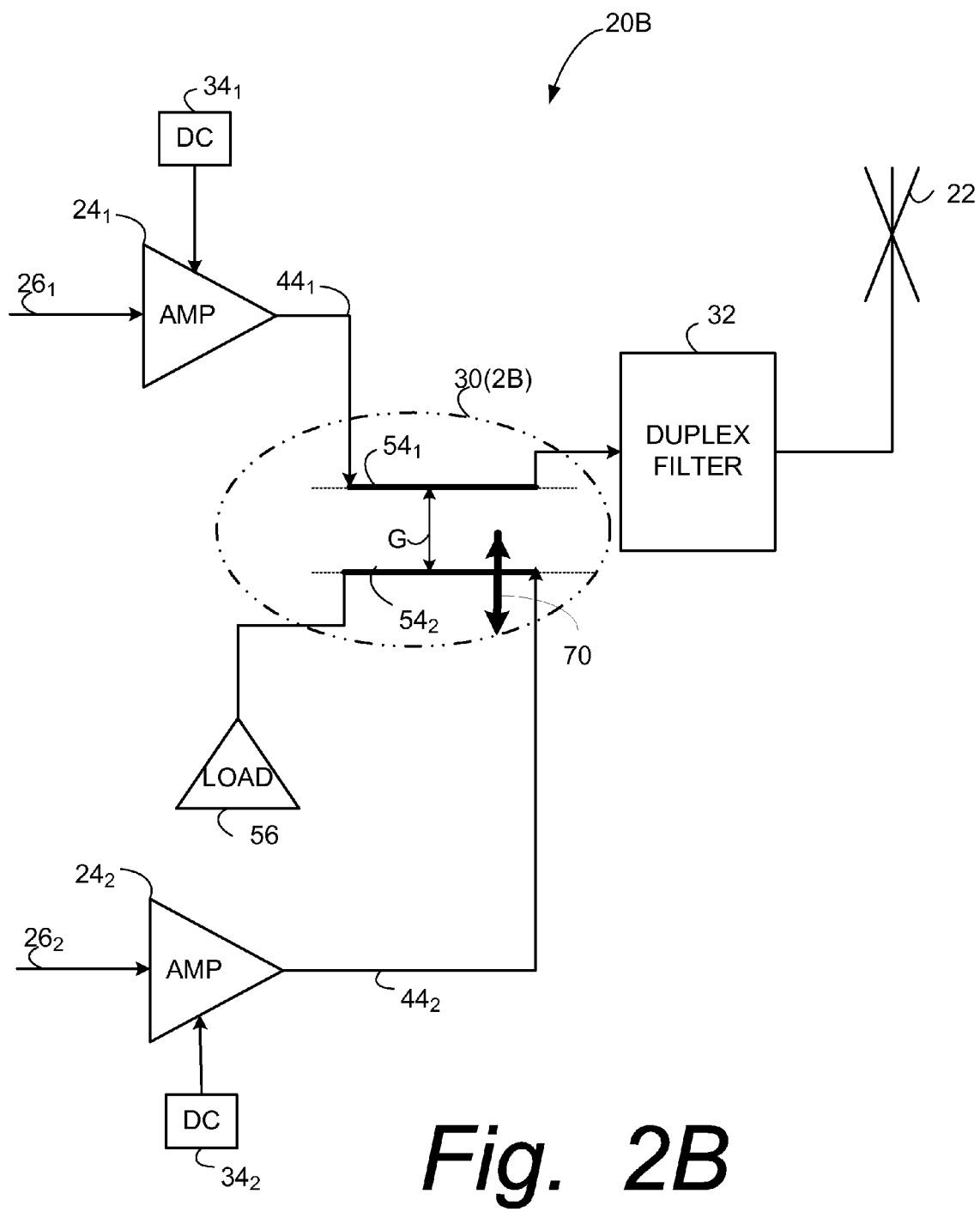
FIG. 2B is a schematic diagram showing an example variation of the embodiment of the radio base station of FIG. 2A.

In some example embodiments, the imbalanced combiner is configured to have adjustable coupling of the first carrier signal and the second carrier signal for applying a selected power imbalance between the first power level of the first carrier signal and the second power level of the second carrier signal. As a first non-limiting example, FIG. 2B shows an example variation of the embodiment of the radio base station 20 of FIG. 2A. The radio base station 20B of FIG. 2B, like that of FIG. 2A, the second coupler element $54_2$ is spaced apart from the first coupler element $54_1$ by a gap G. However, the imbalanced coupler 30(2B) of FIG. 2B is configured whereby the magnitude of the gap G is adjustable for applying the selected power imbalance between the first power level of the first carrier signal and the second power level of the second carrier signal. In FIG. 2B, adjustability of the magnitude of gap G is depicted by arrow 70, which indicates adjustability of the spatial relationship between the second coupler element $54_2$ is spaced apart from the first coupler element $54_1$, and thus of gap G.

Figure 4A:
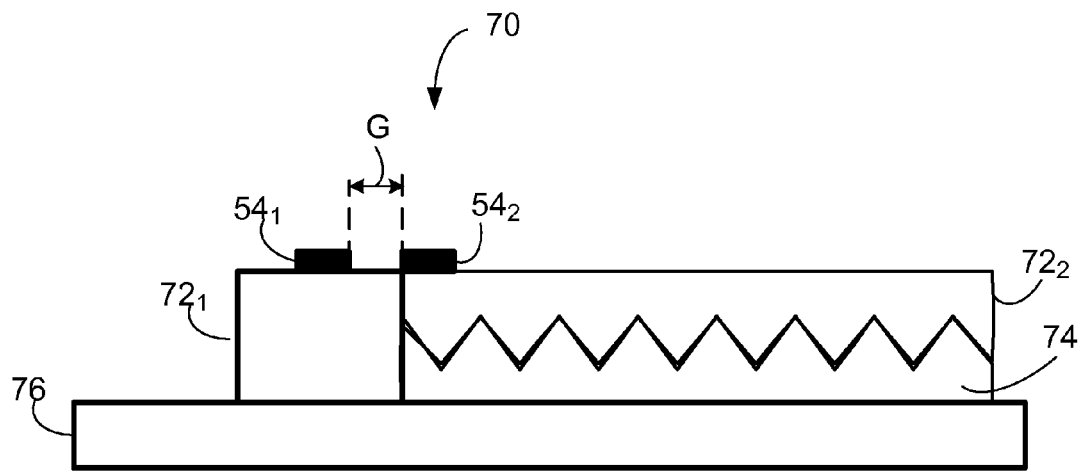
FIG. 4A and FIG. 4B are side views show differing positions of an example, non-limiting embodiment of a power imbalance selection mechanism suitable for use with example embodiments of imbalanced combiners.
Figure 4B:
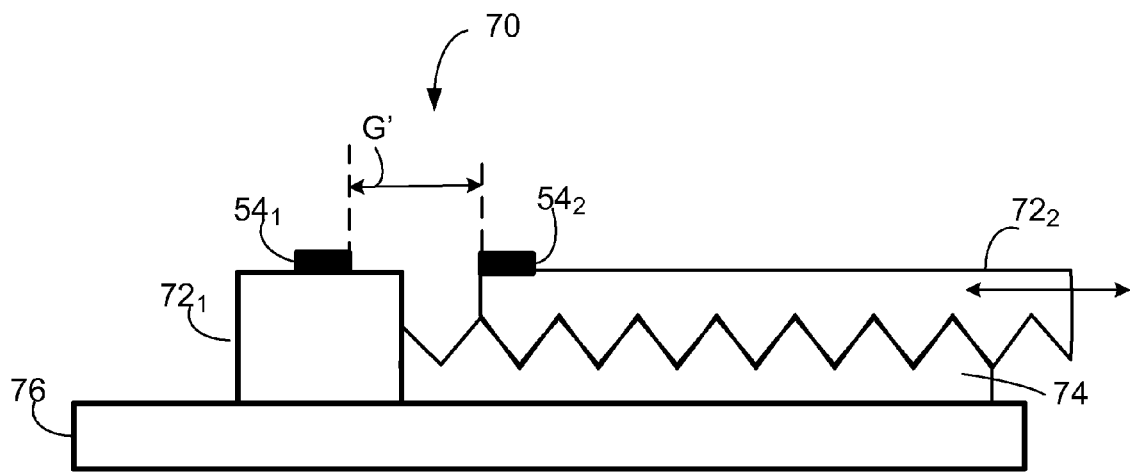

Many structural arrangements or techniques are possible for facilitating adjustment of gap G, and thus for selecting the desired power imbalance between the first power level of the first carrier signal and the second power level of the second carrier signal. FIG. 4A and FIG. 4B illustrate just one example, non-limiting power imbalance selection mechanism 70 for providing such adjustability. The power imbalance selection mechanism 70 is shown as comprising a support block $72_1$ for first coupler element $54_1$ as well as a moveable support block $72_2$ for second coupler element $54_2$. The moveable support block $72_2$ for second coupler element $54_2$ is shown as being selectively positionable in the direction of the width of gap G. The moveable support block $72_2$ for second coupler element $54_2$ is positioned above base block 74. Both base block 74 and support block $72_1$ are mounted on a substrate or circuit board 76.

An upper surface of base block 74 and an under surface of moveable support block $72_2$ are configured with features which mate or interlock at selective positions in the direction of the width of gap G. In the example provided, the upper surface of base block 74 and the under surface of moveable support block $72_2$ are provided with teeth in gear-like or rack and pinon-like manner. In view of the adjustability, the magnitude of gap G can be adjusted to the gap magnitude G' (or any other desired magnitude) as shown in FIG. 4B.

Features other than those shown in FIG. 4A and FIG. 4B may be employed for the mating. Alternatively, the support block $72_2$ may be slidable or otherwise translatable along the upper surface of base block 74. Moreover, it will be appreciated that one or more of support block $72_1$ and support block $72_2$ may be moveable, e.g., in the manner of FIG. 4A and FIG. 4B.

Figure 3A:
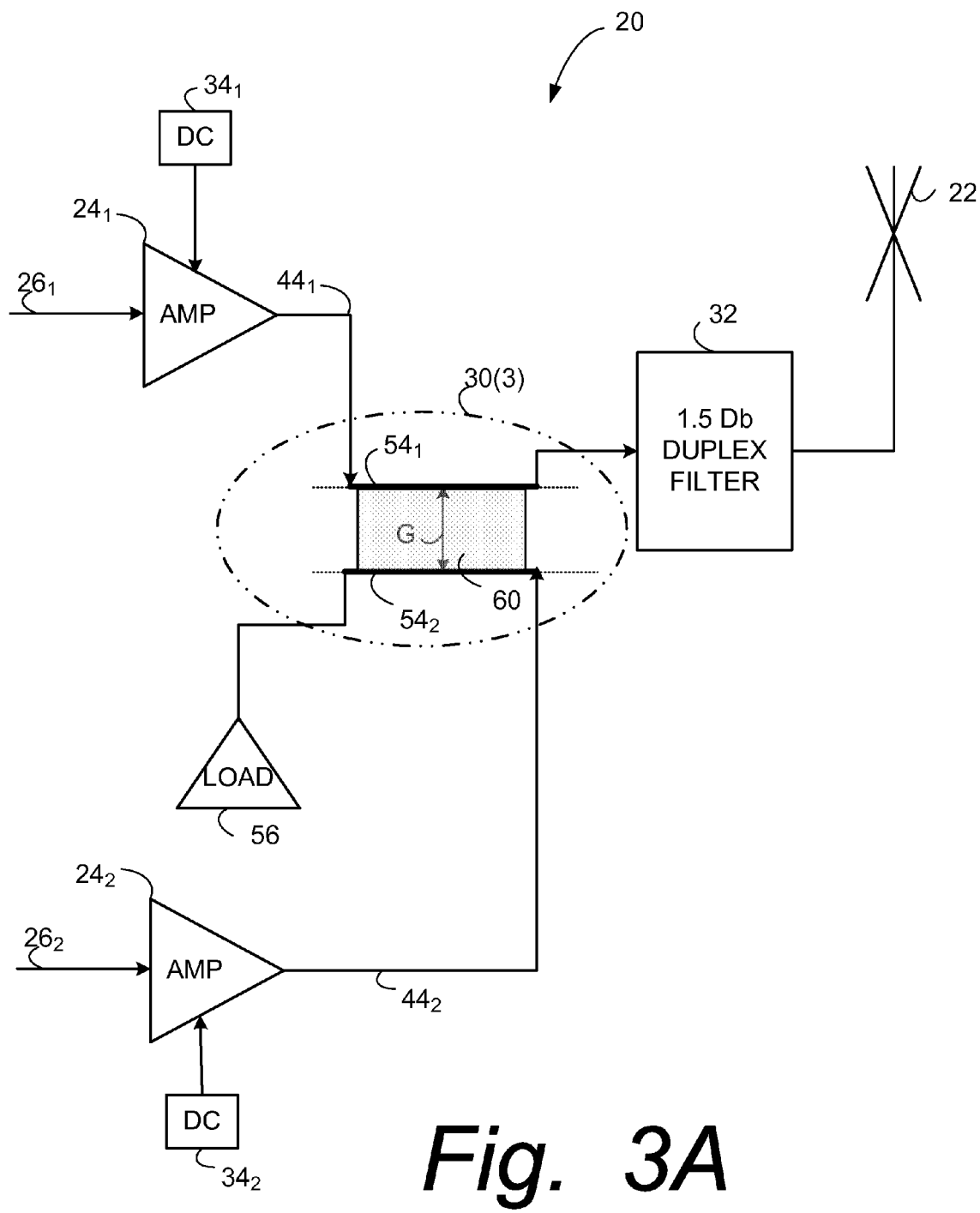
FIG. 3A is a schematic diagram showing portions of another example embodiment of a radio base station configured to employ an imbalanced combiner.
Figure 3B:
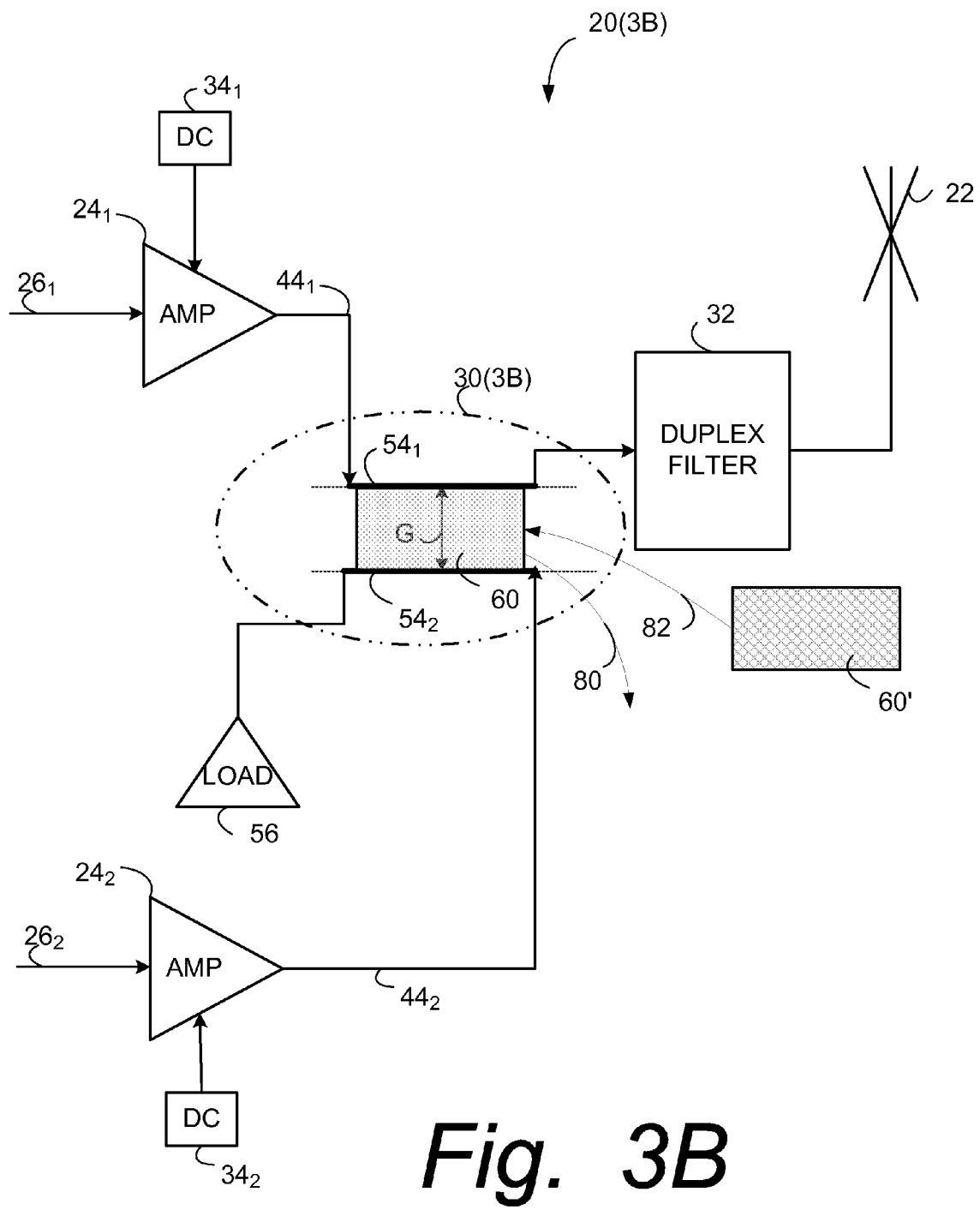
FIG. 3B is a schematic diagram showing an example variation of the embodiment of the radio base station of FIG. 3A.

FIG. 3B shows another example of adjustable or changeable coupling of the first carrier signal and the second carrier signal for applying a selected power imbalance. The imbalanced coupler 30(3B) of FIG. 3B is configured so that the coupling medium is interchangeable for applying the selected power imbalance between the first power level of the first carrier signal and the second power level of the second carrier signal. In FIG. 3B, arrow 80 shows removal of a first coupling medium 60, while arrow 82 shows substitutionary insertment of a second coupling medium 60'. The second coupling medium 60' preferably has one or more different attributes than first coupling medium 60, e.g., a different characteristic or composition (such as different dielectric constant), for example.

Figure 3C:
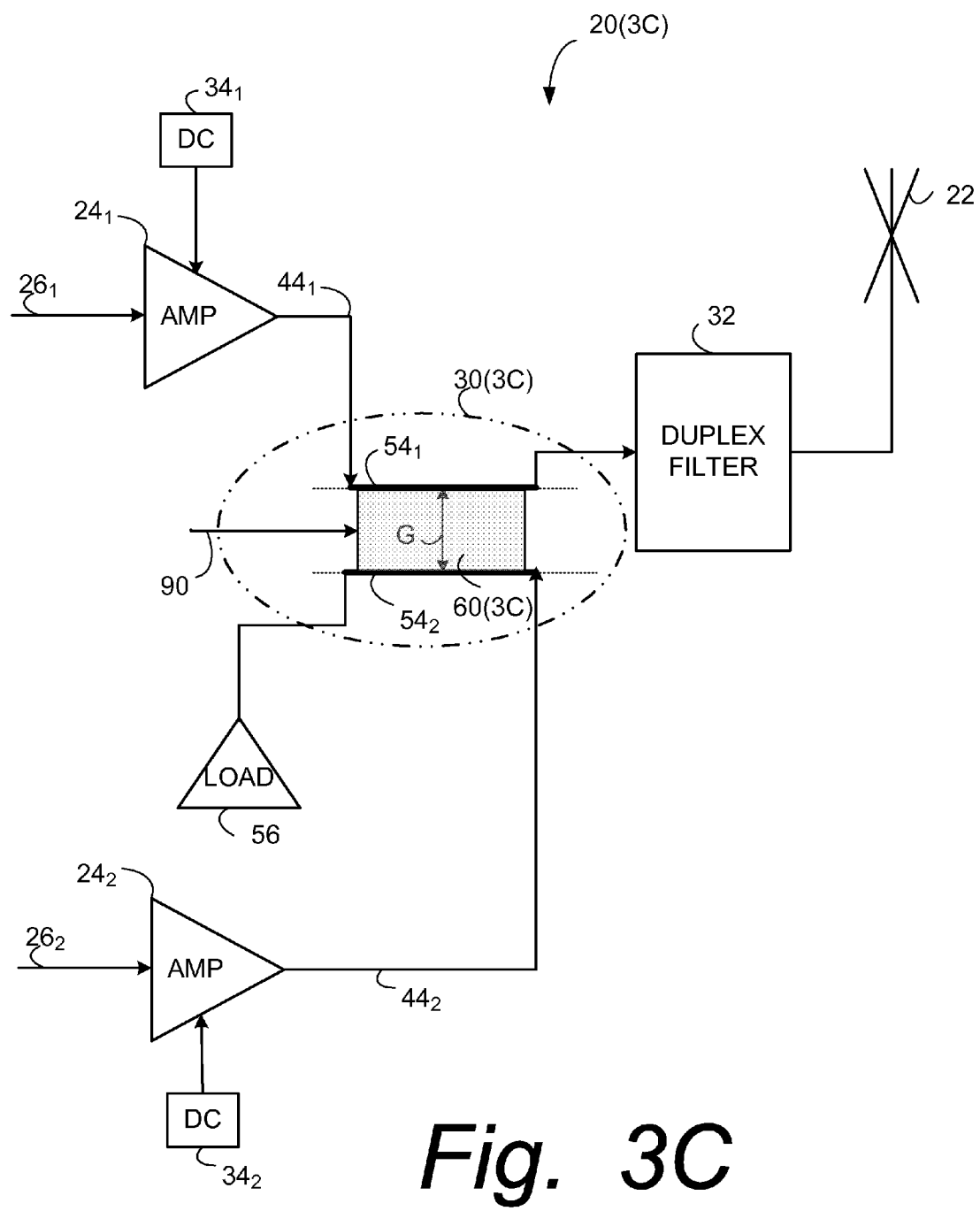

FIG. 3C shows yet another example of adjustable or changeable coupling of the first carrier signal and the second carrier signal for applying a selected power imbalance. The imbalanced coupler 30(3C) of FIG. 3C is configured so that the coupling medium is changeable by modifying (without removal) an attribute (e.g., a characteristic, composition, or configuration) of an extant material or fluid serving as the coupling medium. FIG. 3C depicts by arrow 90 the change or modification of the attribute of the coupling medium 60(3C). The change of attribute depicted by arrow 90 can be accomplished in any of several ways, such as (by way of non-limiting example): applying a (e.g., electrical) signal, applying a (electrical or magnetic) field, coating, injecting, treating, or otherwise modifying an attribute of the coupling medium 60(3C) in a manner to affect the coupling between the carrier signals.

In an example implementation of the radio base station, the first carrier signal transmitted by antenna 22 as included in the imbalanced combined signal is for a user situated at a first distant from the radio base station, while the second carrier signal transmitted by antenna 22 as included in the imbalanced combined signal is for a user situated at a second and greater distant from the radio base station. Thus, the first (higher power) carrier signal as transmitted in the imbalanced combined signal essentially serves a function similar to that of a signal from a macro radio base station serving a macro cell, while the second (lower power) carrier signal as transmitted in the imbalanced combined signal essentially serves a function similar to that of a signal from a micro radio base station serving a micro cell.

According to another aspect of the technology, a method of operating a radio base station comprises using a first power amplifier to obtain a first amplified carrier signal; using a second power amplifier to obtain a second amplified carrier signal; and obtaining (from the first amplified carrier signal and the second amplified carrier signal) a power imbalanced combined signal. The power imbalanced combined signal has a power imbalance between a first power level of the first carrier signal and a second power level of the second carrier signal as transmitted by the antenna. A coupling factor of the imbalanced combiner is related to the power imbalance between the first carrier signal and the second carrier signal. That is, the coupler of the imbalanced combiner is configured so that a ratio of the first power level of the first carrier signal to the second power level of the second carrier signal is the desired power imbalance.

Conventionally both carrier signals transmitted from the same antenna cover the complete cell, e.g., have essentially the same power for transmission throughout the cell. As such, the two carrier signals are combined in a balanced manner. The most commonly used existing technology is to use a hybrid combiner. A hybrid combiner is a balanced coupler comprising an arrangement of quarter wave metal strips. Another combining technique is filter combining, sometimes used for larger systems.

By contrast, the technology described herein employs imbalanced combining using structure such as that illustrated (by way of example) by imbalanced combiner 30. As indicated above, one example embodiment of imbalanced combiner 30 comprises two strips of metal (e.g., first coupling element $54_1$ and second coupler element $54_2$) separated by a small distance or gap G. At one end of each strip power is applied. The power is then coupled between the strips. At the output of each strip a portion of each input signal is obtained. The ratio of the obtained power for each carrier is depending on the distance G between the strips.

In both the example embodiment of FIG. 2A and the example embodiment of FIG. 3A and variations thereof, the coupling existing between first coupling element $54_1$ and second coupler element $54_2$ is such that output power of the first carrier signal and the second carrier signal are reciprocally related. In other words, if 80% power of a first input (e.g., a first carrier) ends up at a first output terminal of the imbalanced combiner 30, 20% power of the second input (e.g., a second carrier) ends up at the first output terminal. The reciprocal nature is further demonstrated in Table 1. For each of two carriers, each row of Table 1 shows (1) the carrier's power as being a specified percentage (e.g., 10%, 20%, 33%, 50%, etc.) of total output power and (2) the loss in decibels for the carrier occasioned by the coupling scenario of the row. The loss in decibels occasioned by the coupling is understood with reference to Equation 3.

$$\text{loss in } db = -10 * \text{LOG}(\text{loss in } \%/100) \quad \text{Equation 3}$$

TABLE 1

| First Carrier % of Output Power | First Carrier % power loss in decibels | Second Carrier % of Output Power | Second Carrier % power loss in decibels |
|---|---|---|---|
| 10% | 10 dB | 90% | 0.45 dB |
| 20% | 7 dB | 80% | 1 dB |
| 33% | 4.8 dB | 66% | 1.8 dB |
| 50% | 3 dB | 50% | 3 dB |
| 66% | 1.8 dB | 33% | 4.8 dB |
| 80% | 1 dB | 20% | 7 dB |
| 90% | 0.45 dB | 10% | 10 dB |

As illustrated and understood, e.g. by Table 1, the imbalanced combiner is configured to combine the first carrier and the second carrier for application to the antenna in a manner to reciprocally modify power of the first carrier and power of the second carrier. That is, if the spacing of the first coupling element $54_1$ and second coupler element $54_2$ is such that output power of the first carrier signal is X % of the total output power, then the output power of the second carrier signal is 100−X %.

As mentioned before, in the particular embodiment shown in FIG. 2A and FIG. 3A, the example first power amplifier $24_1$ operates at 50 W and the example second power amplifier $24_2$ operates at 56 W. Moreover, as applied to imbalanced combiner 30, the first carrier shown on line $44_1$ has a power of 43 dBm (20 W) while the second carrier shown on line $44_2$ has a power of 43.5 dBm (22 W). Both carriers lose only a minor fraction of their power traveling through imbalanced combiner 30, such lost amount being negligible in calculations. Further, both carriers lose 1.5 dB in duplex filter 32. In addition, 0.5 dB of the power of the first carrier is coupled to the termination 56, e.g., 0.5 dB of the useful power of the first carrier is lost in the combining. As a result, the power of the first carrier as included in the imbalanced combined signal at antenna 22 is 41 dBm (43 dBm−0.5 dB−1.5 dB=41 dBm), e.g., 12 W. Concerning the second carrier, 10 dB of the power of the second carrier is coupled to the termination 56, e.g., 10 dB of the useful power of the second carrier is lost in the combining. As a result, the power of the second carrier as included in the imbalanced combined signal at antenna 22 is 32 dBm (43.5 dBm−1.5 dB−10 dB=32 dBm), e.g., 2 W. Thus, even thought the power applied to second power amplifier $24_2$ for the second carrier is greater than the power applied to first power amplifier $24_1$, the imbalanced coupling provided by imbalanced combiner 30 does, in fact, give an imbalance of power for the two carriers as included in the combined signal: the first carrier is transmitted at 41 dBm (12 W); the second carrier is transmitted at 32 dBm (2 W). Accordingly, antenna 22 has two carrier signals, a first carrier signal having 41 dBm (12 W) and a second carrier signal having 32 dBm (2 W), for a total antenna output power of 14 W.

Therefore, in the particular example embodiments shown in FIG. 2A and FIG. 3A, the power input to radio base station 20 is 106 W (the sum of powers supplied by power supplies $34_1$ and $34_2$). The radio frequency output power for the imbalanced combined signal as transmitted by antenna 22 is 14 W (the sum of the 12 W transmission power of the first carrier signal and the 2 W transmission power of the second carrier signal). Therefore, the heat out for the radio base station 20 of FIG. 2A and FIG. 3A is 92 W.

Incidentally, in the example embodiment of FIG. 2A and FIG. 3A, the 56 W applied to second power amplifier $24_2$ is computed to provide the second carrier signal with a desired 32 dBm at the antenna port, which corresponds to the power for some conventional micro radio base stations.

The configuration and operation of the radio base stations described herein thus is much more favorable than the conventional radio base station shown in FIG. 1. Whereas the conventional radio base station example consumed 200 W in input power but lost 175 W as heat out, the radio base station 20 of FIG. 2A and radio base station 20(3) of FIG. 3A consume only 106 W in input power and has heat out of 92 W. Thus, the radio base stations of the example embodiments of FIG. 2A and FIG. 3A generate less heat and require less input power, while at the same time providing carrier signals of requisite power for their intended recipients.

With these assumptions the overall radio efficiency is increased from 12.5% to 27%, given that the allocation algorithms can still serve the cell. The foregoing calculations shows the radio base station running at maximum output power. Typically this is not the case, and is handled by stepping down the power. But at lower output powers than the maximum, the efficiency decreases both for the power amplifier and for the power supply. With the suggested arrangement a better performance could be expected as the low power users will use a power amplifier operating closer to its maximum power.

Again it is stressed that the power values provided in conjunction with the illustrated examples such as FIG. 2A and FIG. 3A are solely for sake of example and comparison with the analogous conventional radio base station of FIG. 1. It will be appreciated that the foregoing principles and techniques can be applied with other power values to other arrangements within the spirit and scope of the technology described herein.

The imbalanced combiner is configured to combine the first carrier and the second carrier for application to the antenna 22 in a manner to preferentially modify power of the first carrier and power of the second carrier whereby power loss occasioned by the combiner is less for the first carrier than for the second carrier. Thus, the reciprocal coupling physics of imbalanced combiner is used to reduce the power loss of the first carrier signal occasioned by combining, while still rendering the second carrier useful, e.g., in a manner analogous to service of a smaller target audience, such as a microcell, for example.

Thus, the imbalanced combiner imposes less combining loss on the first carrier signal and a greater combining loss on the second carrier signal. The fact that the second carrier signal suffers greater loss is not detrimental since overall power consumption is less and the target audience for the second carrier signal is tailored accordingly. In terms of audience, the high power of the first carrier signal is substantially equal to conventional carrier signals and the low power of the second carrier signal is substantially the same as a carrier signal for a micro radio base station.

It will be appreciated from the foregoing that a different ratio of carrier powers for the imbalanced combined signal can be achieved with a different coupling factor, e.g., a different gap size G between first coupling element $54_1$ and second coupler element $54_2$.

The technology is not limited to the use of spaced-apart, parallel metal strips for realizing the imbalanced combiner. Any suitable structure which accomplishes the imbalanced combining is encompassed.

Figure 5:
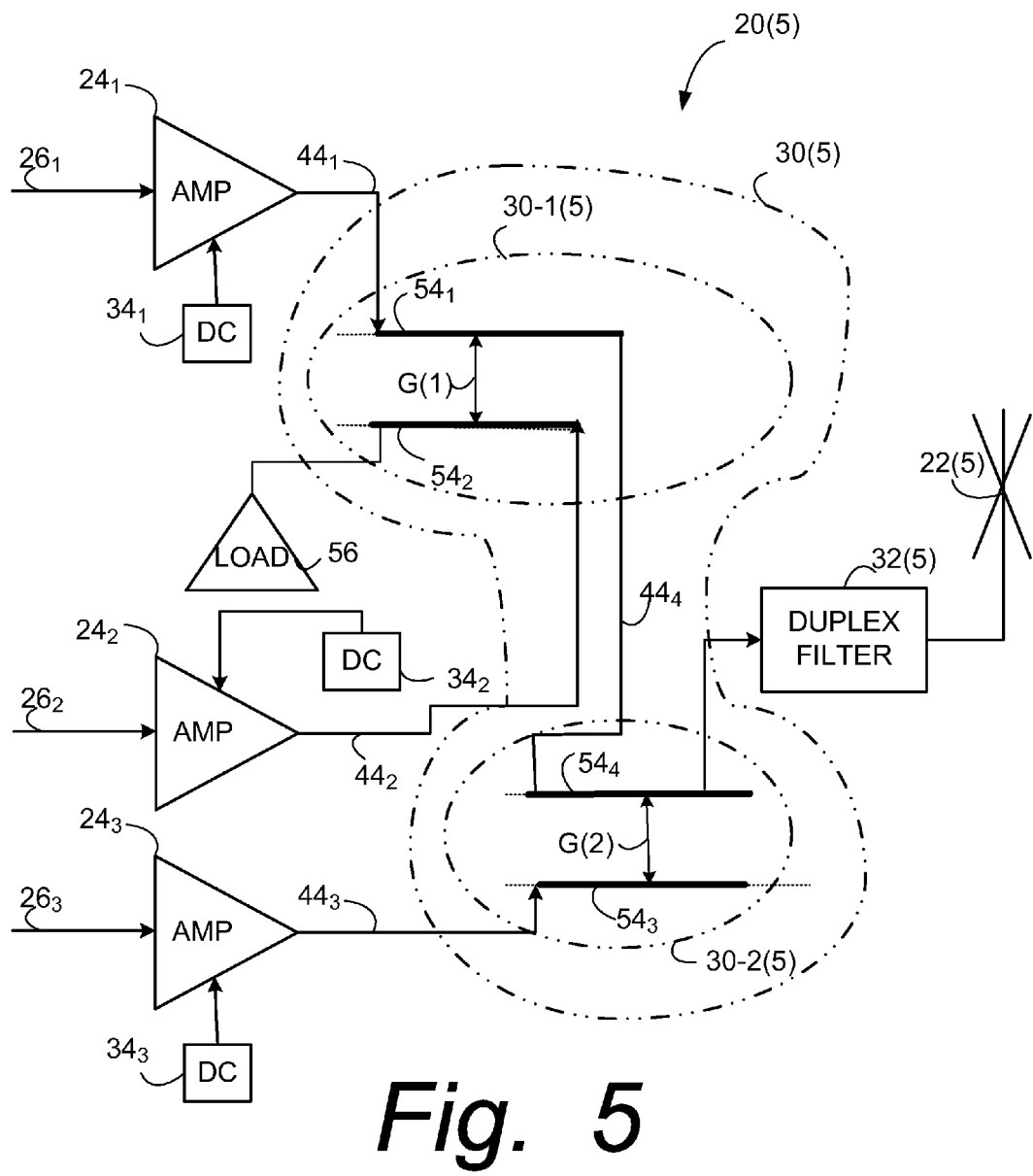
FIG. 5 is a schematic diagram showing portions of an example embodiment of a radio base station comprising a imbalanced combiner handling plural carrier signals.

Nor is the technology limited to imbalanced combination of only two carrier signals, as use of a combination of port couplers may permit an imbalanced combiner to handle three or more carrier signals. For example, FIG. 5 illustrates a radio base station 20(5) having antenna 22(5) capable of carrying three carrier signals. In other words, FIG. 5 shows a three carrier signal embodiment which includes not only the first carrier signal applied on line $44_1$ and second carrier signal applied on line $44_2$ as described with reference to the embodiment of FIG. 2A, for example, but also a third carrier signal applied on line $44_3$. The imbalanced combiner 30(5) of FIG. 5 comprises two sections or stages, including a first stage 30-1(5) and a second stage 30-2(5). In the first stage 30-1(5) the first carrier signal is applied on line $44_1$ to coupler element $54_1$ and second carrier signal is applied on line $44_2$ to coupler element $54_1$ for a preferential coupling dependent upon the combination characteristic of stage 30-1(5), e.g., the magnitude of gap G(1), in similar manner as the embodiment of FIG. 2A. The combined output signal which results from the preferential coupling of stage 30-1(5) is applied on line $44_4$ to coupling element $54_4$ of second stage 30-2(5). In the second stage 30-2(5), the third carrier signal is applied on line $44_3$ to coupler element $54_3$. The second stage 30-2(5) serves to preferentially couple the signal on line $44_4$ with the third carrier on $44_3$. The preference of the coupling of second stage 30-2(5) is dependent upon the combination characteristic of stage 30-2(5), e.g., the magnitude of gap G(2). The combined output of second stage 30-2(5) is applied to duplex filter 32(5), and the filtered output of duplex filter 32(5) with the three combined carrier signals is applied to antenna 22(5).

The preference of the combination accomplished by each stage of imbalanced combiner 30(5) is dependent upon a property or characteristic of the respective stage, such as a magnitude of gap G(1) for stage 30-1(5) and a magnitude of gap G(2) for stage 30-2(5) existing between coupler elements of the respective stages. The magnitude of gap G(2) of the second stage can be, for example, the same or different from the magnitude of gap G(1) of the first stage of imbalanced combiner 30(5).

Further stages can be added to an imbalanced combiner such as (for example) the imbalanced combiner 30(5) of FIG. 5, so that it is apparent that two, three or more carrier signals can be subject to imbalanced combining in accordance with the technology herein described.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A radio base station comprising:
   an antenna;
   a first power amplifier configured to receive a first carrier signal;
   a second power amplifier configured to receive a second carrier signal;
   an imbalanced combiner configured to apply a power imbalanced combined signal to the antenna, the power imbalanced combined signal having a power imbalance at least between a first power level of the first carrier signal and a second power level of the second carrier signal at the antenna; and
   a coupler, the coupler comprising:
   a first coupling element, the first coupling element comprising a first end connected to an output of the first power amplifier and a second end connected to the antenna;
   a second coupling element, the second coupling element comprising a first end connected to an output of the second power amplifier and a second end terminated without connection to the antenna;
   a coupling medium positioned between the first coupling element and the second coupling element, the coupling medium being configured to be interchangeable and positioned between the first coupling element which carriers the first carrier signal and the second coupling element which carriers the second carrier signal.

2. The apparatus of claim 1, wherein the second coupling element is spaced apart from the first coupling element by a gap, and wherein the power imbalance in the power imbalanced combined signal is related to a magnitude of the gap.

3. The apparatus of claim 1, wherein the second coupling element is spaced apart from the first coupling element by a gap, wherein a power ratio of the first power level to the second power level is related to a magnitude of the gap.

4. The apparatus of claim 1, wherein the power ratio of the first power level of the first carrier signal to the second power level of the second carrier signal is in a range from about 2:1 to about 10:1.

5. The apparatus of claim 1, wherein an attribute the coupling medium is chosen to impart the power imbalance in the power imbalanced combined signal.

6. The apparatus of claim 5, wherein the attribute comprises dielectric constant of the coupling medium.

7. The apparatus of claim 5, wherein the attribute comprises configuration of the coupling medium.

8. The apparatus of claim 1, wherein the imbalanced combiner is configured to have adjustable coupling of the first carrier signal and the second carrier signal for applying a selected power imbalance between the first power level of the first carrier signal and the second power level of the second carrier signal.

9. The apparatus of claim 1,
wherein the second coupling element is spaced apart from the first coupling element by a gap, and wherein the imbalanced coupler is configured whereby a magnitude of the gap is adjustable for applying the selected power imbalance between the first power level of the first carrier signal and the second power level of the second carrier signal.

10. The apparatus of claim 1, wherein the first carrier signal is for a user situated at a first distant from the radio base station and wherein the second carrier signal is for a user situated at a second distant from the radio base station, and wherein the first distance is greater than the second distance.

11. The apparatus of claim 1, further comprising means for adjusting coupling of the first carrier signal and the second carrier signal.

12. The apparatus of claim 1, wherein the imbalanced power combiner is configured to combine more than two carrier signals in the power imbalanced combined signal.

13. A method of operating a radio base station comprising:
using a first power amplifier to obtain a first amplified carrier signal;
using a second power amplifier to obtain a second amplified carrier signal;
obtaining, from the first amplified carrier signal and the second amplified carrier signal, a power imbalanced combined signal, the power imbalanced combined signal having a power imbalance between a first power level of the first carrier signal and a second power level of the second carrier signal as transmitted from the antenna;
configuring a coupler to comprise a first coupling element and the second coupling element situated in a spaced apart relationship to a first coupling element, the first coupling element comprising a first end connected to an output of the first power amplifier and a second end connected to the antenna, the second coupling element comprising a first end connected to an output of the second power amplifier and a second end terminated without connection to the antenna;
adjusting a coupling of the first carrier signal and the second carrier signal by interchanging a coupling medium between the first coupling element which carriers the first carrier signal and the second coupling element which carriers the second carrier signal.

14. The method of claim 13, further comprising spacing apart the second coupling element from the first coupling element by a gap having a gap magnitude related to a desired power imbalance in the power imbalanced combined signal.

15. The method of claim 13, further comprising adjusting coupling of the first carrier signal and the second carrier signal for applying a selected power imbalance between the first power level of the first carrier signal and the second power level of the second carrier signal.

16. The method of claim 13, further comprising adjusting the coupling of the first carrier signal and the second carrier signal by selecting an attribute of a coupling medium between a first coupling element which carriers the first carrier signal and a second coupling element which carriers the second carrier signal.

17. The method of claim 13, further comprising adjusting the coupling of the first carrier signal and the second carrier signal by interchanging a coupling medium between a first coupling element which carriers the first carrier signal and a second coupling element which carriers the second carrier signal.

18. The method of claim 13, further comprising adjusting the coupling of the first carrier signal and the second carrier signal by adjusting magnitude of a gap separating a first coupling element which carriers the first carrier signal and a second coupling element which carriers the second carrier signal.

19. The apparatus of claim 13, further comprising:
operating the first carrier signal for a user situated at a first distant from the radio base station; and
operating the second carrier signal for a user situated at a second distant from the radio base station, and wherein the first distance is greater than the second distance.

20. The method of claim 13, further comprising adjusting the coupling of the first carrier signal and the second carrier signal by modifying an attribute of the coupling medium, wherein the attribute is a characteristic, composition, or configuration of a material serving as the coupling medium.

* * * * *

UNITED STATES PATENT AND TRADEMARK OFFICE
CERTIFICATE OF CORRECTION

| | | |
|---|---|---|
| PATENT NO. | : 8,515,377 B2 | Page 1 of 1 |
| APPLICATION NO. | : 11/684692 | |
| DATED | : August 20, 2013 | |
| INVENTOR(S) | : Lindskog | |

It is certified that error appears in the above-identified patent and that said Letters Patent is hereby corrected as shown below:

In the Specifications

In Column 1, Line 22, delete "like," and insert -- like. --, therefor.

In Column 5, Lines 21-22, delete "a imbalanced" and insert -- an imbalanced --, therefor.

In the Claims

In Column 13, Line 38, in Claim 10, delete "distant" and insert -- distance --, therefor.

In Column 13, Line 40, in Claim 10, delete "distant" and insert -- distance --, therefor.

In Column 14, Line 5, in Claim 13, delete "in a spaced" and insert -- in spaced --, therefor.

In Column 14, Line 46, in Claim 19, delete "distant" and insert -- distance --, therefor.

In Column 14, Line 48, in Claim 19, delete "distant" and insert -- distance --, therefor.

Signed and Sealed this
Twenty-eighth Day of January, 2014

Michelle K. Lee
*Deputy Director of the United States Patent and Trademark Office*